United States Patent
Courtney et al.

[11] Patent Number: 6,038,446
[45] Date of Patent: *Mar. 14, 2000

[54] SATELLITE-BASED CELLULAR TELECOMMUNICATIONS SYSTEM UTILIZING A MULTIPLE REGISTRATION LOCATION REGISTER

[75] Inventors: William F. Courtney, Long Beach; Carl F. Reisig, Torrance, both of Calif.

[73] Assignee: TRW Inc., Redondo Beach, Calif.

[*] Notice: This patent is subject to a terminal disclaimer.

[21] Appl. No.: 09/120,618

[22] Filed: Jul. 22, 1998

Related U.S. Application Data

[63] Continuation of application No. 08/648,901, May 16, 1996, Pat. No. 5,890,062.

[51] Int. Cl.[7] .................................................. H04Q 7/22
[52] U.S. Cl. ........................ 455/428; 455/433; 455/445
[58] Field of Search ............................. 455/428, 430, 455/432, 433, 435, 448, 12.1, 456

[56] References Cited

U.S. PATENT DOCUMENTS

| | | | |
|---|---|---|---|
| 5,400,390 | 3/1995 | Salin | 455/445 |
| 5,537,679 | 7/1996 | Crosbie et al. | 455/428 |
| 5,564,068 | 10/1996 | Nguyen | 455/433 |
| 5,574,968 | 11/1996 | Olds et al. | 455/428 |
| 5,579,375 | 11/1996 | Ginter | 455/433 |
| 5,590,175 | 12/1996 | Gallant et al. | 455/433 |
| 5,590,398 | 12/1996 | Matthews | 455/433 |
| 5,594,942 | 1/1997 | Antic et al. | 455/433 |
| 5,604,920 | 2/1997 | Bertiger et al. | 455/428 |
| 5,610,972 | 3/1997 | Emery | 455/433 |

*Primary Examiner*—Edward F. Urban
*Attorney, Agent, or Firm*—Michael S. Yatsko

[57] ABSTRACT

A satellite based telecommunications system having a multiple registration location register which enables a terminal to register with more than one earth station simultaneously, without any particular one of the earth stations knowing that the terminal is registered elsewhere. The multiple registration location register receives the registration information from each of the earth stations and records the information. This information is used by the multiple registration location register to re-route calls to an earth station that is providing coverage for the terminal. The multiple registration location register may consider many system factors, including satellite to earth station connectivity and satellite to terminal connectivity, in determining to which earth station it should route calls.

7 Claims, 12 Drawing Sheets

SATELLITE-BASED CELLULAR TELECOMMUNICATIONS SYSTEM UTILIZING A MULTIPLE REGISTRATION LOCATION REGISTER

This is a continuation, of application Ser. No. 08/648,901, filed May 16, 1996, now U.S. Pat. No. 5,890,062.

BACKGROUND OF THE INVENTION

In known terrestrial cellular telecommunications systems the resources that enable a terminal (e.g., mobile phone, fixed terminal, etc.) to communicate on the system are fixed with respect to the terrain. Generally the terrain is divided into distinct cells 2 (FIG. 1) which may be grouped into location areas 9. By way of example, the borders of the location areas 9 are set forth in bold. The location areas 9 are grouped into mobile service switching centers (MSC) regions 6. The MSC regions 6 together constitute the service area of a Public Land Mobile Network (PLMN) 8.

Each cell is supported by a unique set of radio resources, including a radio tower. These resources are part of a Base Station Subsystem (BSS). The resources devoted to a single cell are supported by a Base Transceiver Station (BTS). The terrestrial area included in a cell is therefore dictated by the coverage capabilities of its associated radio tower. A location area is a set of cells which are treated as a common pool of radio resources for certain functions such as the paging of a terminal to notify it of an incoming call. That is, all cells in a location area would page the called terminal. By grouping cells into location areas, the system defines a larger terrestrial area than that supported by a single cell. Hence, a terminal is allowed to roam over a larger area and still have the cellular network consider its position as being 'known'.

A location area, in turn, will belong to one and only one MSC region. A MSC region is the geographical area served by a Mobile-services Switching Center (MSC) (for example, MSCs 11 or 21 of FIG. 1) and its associated Visitor Location Register (VLR) (for example VLRs 13 or 19 of FIG. 1). MSCs and VLRs may be paired together. When it is not important to make a functional distinction between an MSC and a VLR, the pair is referred to as an MSC/VLR. The MSC is the point at which a cellular network interfaces its radio resources network into a traditional land-line based network. Also the MSC may interface with the Public Switched Telephone Network (PSTN), in which case it is referred to as a gateway-MSC (GW-MSC) 5.

When a terminal is purchased, it is assigned a mobile-services integrated services digital network (MSISDN) number, i.e., a mobile phone number, from the block of numbers assigned to the cellular services provider. This number and subscriber service information is entered into a data base called a Home Location Register (HLR) 3. When a terminal is turned on, it searches the airwaves for a broadcast channel which is transmitting location area identification (LAI) information, which information identifies the location area within which the terminal is currently located. Each BTS operates such a broadcast channel in its cell, continuously broadcasting the LAI of the location area to which its cell belongs. The terminal receives the LAI information and compares it to the LAI stored in its memory (if any). The LAI in the terminal's memory represents the last LAI in which the terminal was located while in an active state, or the terminal's memory may be blank as in the case of a new terminal which has never registered. If the broadcast and memory-resident LAIs match, then the terminal goes into a standby mode and is ready to originate or terminate calls.

If the two LAIs do not match, then the terminal must re-register, for the network is not aware of the terminal's current location. The terminal registers by signaling (through the BSS) to the MSC/VLR whose region includes the terminal's current location area. For example, in FIG. 1, terminal 1 would register by signaling to MSC/VLR 11/13. The MSC/VLR 11/13 notes the terminal's current location area and determines whether the terminal is already registered with it in another location area in the same MSC region 6. If so, then the MSC/VLR 11/13 changes the terminal's LAI in its VLR, the registration ends, and the terminal enters a standby mode. However, if terminal 1 were to move from location area 9 to location area 4, the terminal 1 must re-register with MSC/VLR 21/19. Otherwise, neither MSC/VLR 11/13 nor MSC/VLR 21/19 will be able to access terminal 1 since MSC/VLR 11/19 will lack the necessary terminal identification and location information and MSC/VLR 11/13 will be too remote to maintain an RF communications link with the terminal 1. To effect re-registration, the MSC/VLR 21/19 informs the terminal's HLR 3 that the MSC/VLR 21/19 is now servicing the terminal. The HLR 3 notes this information and checks to see whether the terminal 1 was previously registered with another MSC/VLR, such as MSC/VLR 11/13. If a previous registration is recorded, the HLR deletes this old registration and signals the MSC/VLR 11/13 holding the previous registration information to de-register the terminal.

Figure 1:
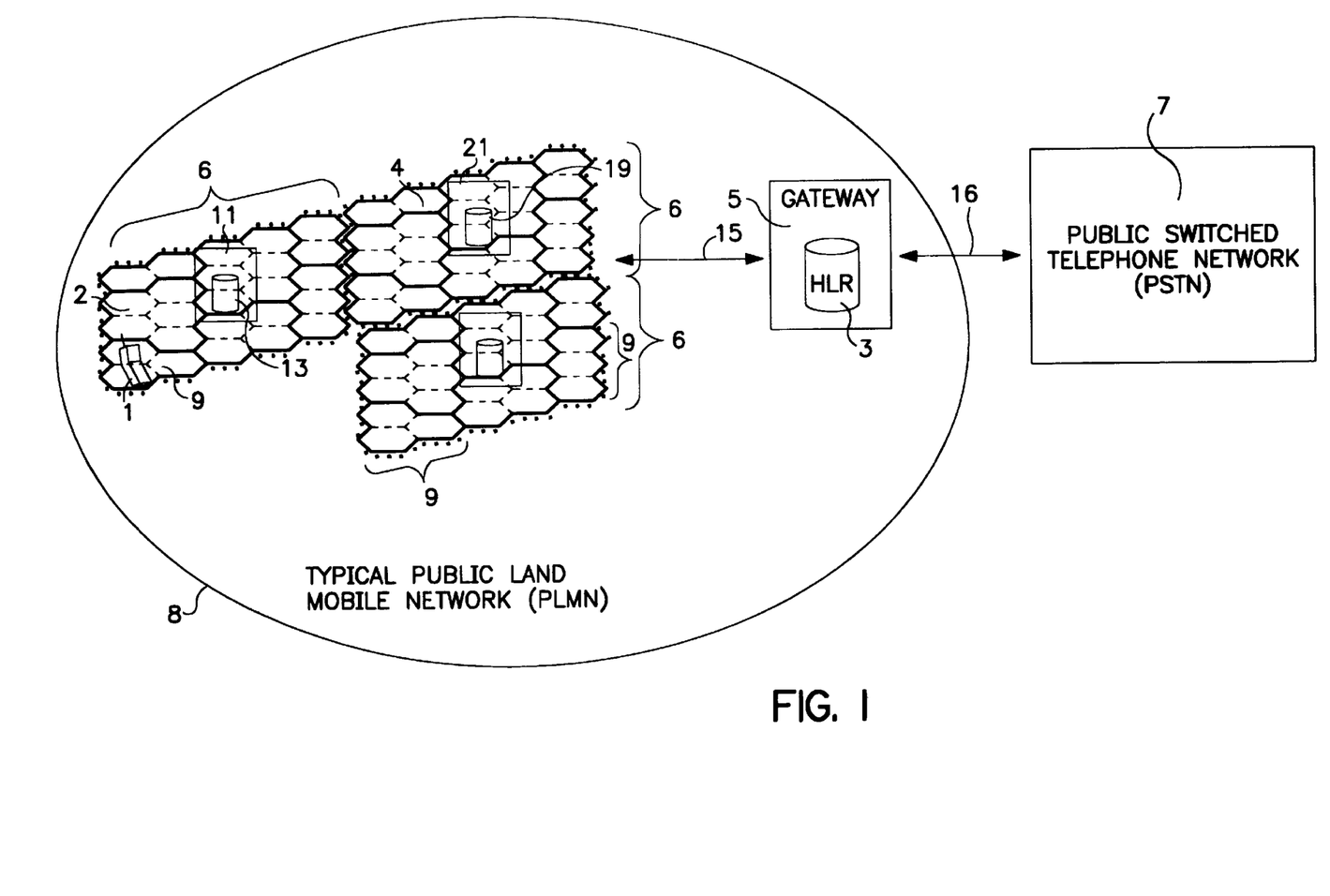
FIG. 1 illustrates a known terrestrial cellular telecommunications system.

The purpose of this exchange of information is to enable the routing of mobile-terminated calls (calls to the terminal) and to be able to identify the terminal when it places mobile-originated calls (calls from the terminal). If such re-registration did not occur, calls placed to terminal 1 would be lost after they reach the GS-MSC since gateway 5 will route such calls to MSC/VLR 11/13 which represents the last known MSC/VLR registered with the HLR 3 for terminal 1. The use of the VLR and HLR information in PLMNs is described below.

Mobile-terminating calls enter the PLMN from the PSTN at a GW-MSC designated to serve this function by the terminal's service provider. The method for routing the call to the GW-MSC may be any standard telephony practice based on the MSISDN number of the called terminal. The GW-MSC examines the called terminal's MSISDN number and determines which HLR serves the subscriber. Based on this information, the GW-MSC signals that HLR and requests information on how to route the call to the called terminal. The HLR consults its data base to determine which MSC/VLR is currently supporting the terminal. This is why the MSC/VLR had to inform the HLR that it is now serving the terminal after the terminal moved. The HLR informs the currently listed MSC/VLR that a call is pending for the terminal with the called MSISDN number, and the HLR requests a telephone number from the MSC/VLR's block of such numbers to be temporarily assigned to the called terminal. This temporary number is referred to as a roaming number. The MSC/VLR delivers the roaming number to the HLR, and the HLR passes it on to the GW-MSC. The GW-MSC uses the roaming number to forward the call to the proper destination MSC/VLR. When the call reaches the MSC/VLR, the MSC/VLR queries its associated VLR to determine the actual identity of the terminal to which this roaming number was assigned and the LAI of the location area in which that terminal should be paged. This is why the terminal must inform the MSC/VLR whenever its location area changes. The VLR responds to the MSC with the terminal's identity and LAI. The MSC requests the BSS to page the terminal in the terminal's location area. The BSS sends this paging request on to the BTSs covering the cells within that location area, and these BTSs broadcast the page. The called terminal hears the page and responds. After a brief exchange of signals, the end-to-end call connection is completed.

Mobile-originating calls do not require so elaborate a routing mechanism. However, as a security measure against fraudulent use of the PLMN and to preserve the confidentiality of the mobile subscriber, the VLR can be given information known only to itself and the terminal. This information is constructed as part of the registration signaling between the terminal and the MSC/VLR and is stored at the terminal and in the VLR. When a mobile-originated call is initiated, this information must be present in the VLR so that fraud-prevention and confidentiality mechanisms can be implemented.

Note that terminal registration (other than the initial registration of a brand-new terminal) is caused by terminal movement from one location area to another. This movement is not coordinated among the terminals, and thus occurs randomly and at a relatively low rate.

Note also that the collecting of cells into location areas is an important trade-off in the detailed design of a cellular system. Large location areas reduce the number of terminal registrations because terminals have to travel farther before they leave their current location area. Since registration consumes radio signaling resources, lowering the number of registrations that occur tends to increase the capacity of a PLMN with a given amount of radio resources. On the other hand, terminals must be paged across their entire location area since a terminal is free to move around inside its location area without informing the network of its movement (via registration). As a location area is made larger, the terminals within it must be paged in more cells. Since paging also consumes radio signaling resources, decreasing the size of location areas tends to increase the capacity of a PLMN with a given amount of radio resources. Thus, it is desirable to find an acceptable size for location areas so that a minimum of radio signaling resources are employed for the joint duties of registration and paging.

The foregoing operation is manageable in conventional terrestrial systems since re-registration is dictated by random movement of individual terminals between location areas. Hence, terminals re-register individually. The terrestrial system never requires simultaneous mass re-registration of a large number of terminals.

However, satellite based systems experience difficulties which do not exist in terrestrial systems. Proposed satellite-based telecommunications systems include terminals, satellites, BSSs/BTSs, earth stations, MSC/VLRs, GW-MSCs, and a terrestrial network interconnecting the earth stations and PSTN. The satellites may perform some functions related to the functionality of the BTSs and the earth station may perform some functions related to the functionality of the BSS.

Satellite-based telecommunications systems have been proposed which employ satellites orbiting the earth at other than geostationary altitudes. The satellites in these systems move with respect to the earth's surface, and so their fields of coverage on the earth's surface continuously change. In an analogy with PLMNs, it is as if the radio towers (BTSs) were in continuous motion. A cell in a mobile system is defined by the reach of the network radio resources supporting that cell, and thus the cells in the satellite-based systems are in continuous motion. Since the cells are in continuous motion, so too are the location areas. Because, as shown above, a terminal must re-register whenever its location area changes, either the terminals would also be continually registering or location areas would have to be made very large.

Further, registrations caused by cell motion can have catastrophic consequences on the operation of the satellite-based systems. The root of the potential catastrophe is the fact that the motion of the satellites affects many terminals in the same way simultaneously, or nearly simultaneously. When a satellite no longer covers a terminal, it is also not covering any other nearby terminals. The ground speed of the field of coverage of satellites in proposed satellite-based telecommunications systems is several kilometers per second. Thus, a great number of terminals may become uncovered by a particular satellite in a matter of seconds. If all of these terminals were to try to immediately re-register over the radio resources in another satellite, that other satellite would be inundated with registration signaling. Such a near-simultaneous registration of terminals in a given geographic area is termed a "mass registration event." At the very least, the satellite's traffic capacity would fall by the amount of signaling required for the registrations. More likely, all available signaling channels would be choked with registration signaling, and no new calls either to or from terminals in the area could be initiated during this registration activity cycle.

Figure 2:
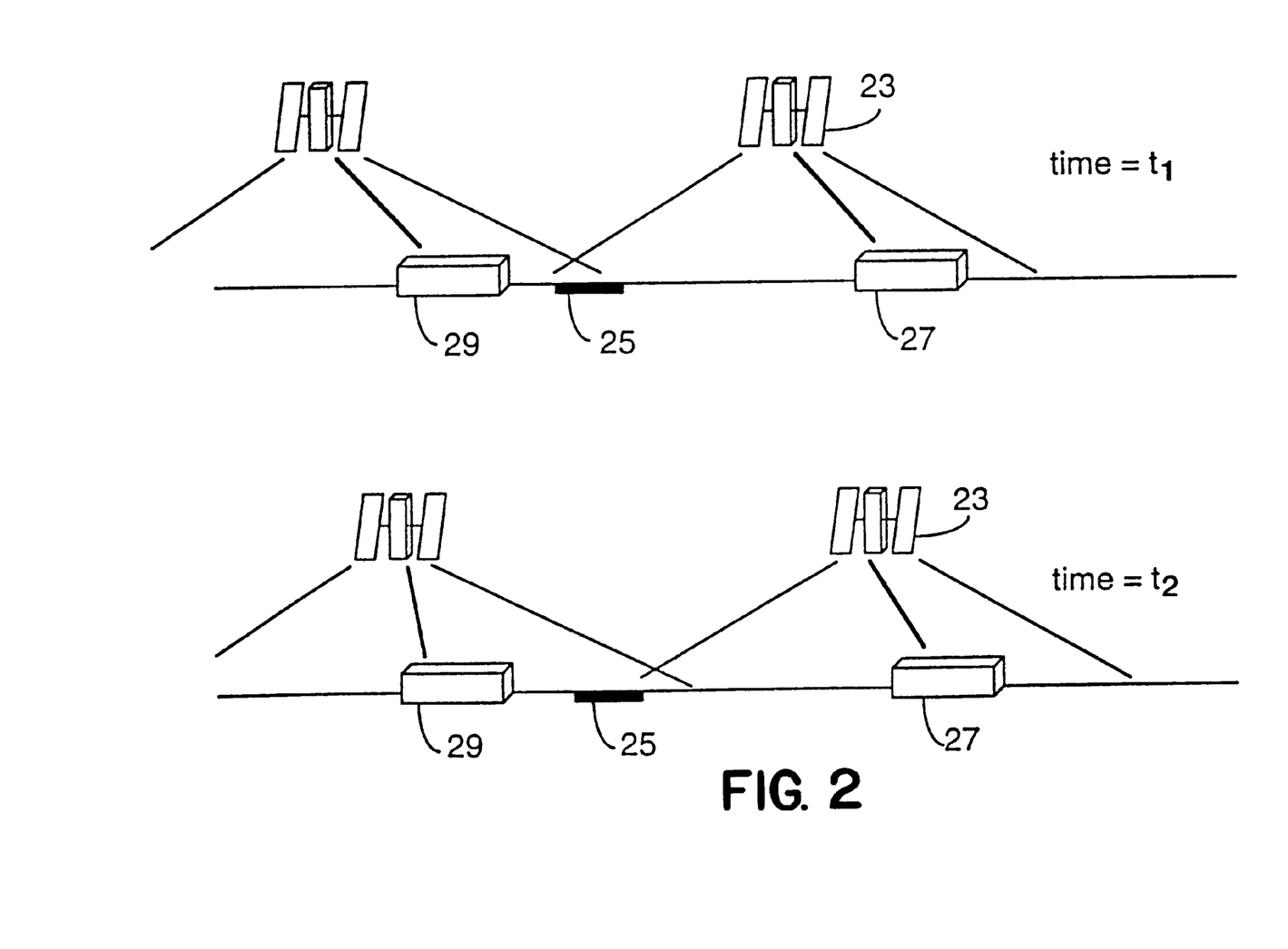
FIG. 2 illustrates how changing satellite to terminal connectivity can trigger terminal re-registrations.

To further illustrate the concept of mass re-registration, reference is made to FIG. 2 which illustrates how changing satellite-to-terminal connectivity can trigger re-registrations between times $t_1$ and $t_2$. At time $t_1$ satellite 23 covers terminals in area 25. At time $t_2$ satellite 23 moves beyond area 25. According to the aforementioned process, when satellite 23 moves, terminals in area 25 registered through satellite 23 at earth station 27 must re-register with earth station 29 or be lost to the system.

Moreover, a mass registration event may occur even while a collection of terminals in a region remains under the coverage of a single satellite. In order for a satellite-based telecommunications system to function, the satellites must remain in contact not only with the terminals but also with the network. The network contact points for satellites are the earth stations. From time to time as it orbits, each satellite breaks contact with some earth stations and establishes contact with others. Conventional satellite-based telecommunications systems include MSC/VLRs as integral parts of each earth station. A satellite must be in contact with an earth station in order to be in contact with the MSC/VLRs in that earth station. Thus, when a leaving satellite breaks contact with an earth station it also breaks contact with the uncovered earth station's MSC/VLR. Hence, when the system routes mobile-terminated calls to the MSC/VLR at which the called terminals are registered, if coverage is being provided through a leaving satellite which has lost contact with the MSC/VLR in the earth station, the uncovered MSC/VLR can no longer complete the mobile-termination calls to the called terminals. All of the terminals registered at the uncovered MSC/VLR and being covered by the leaving satellite have effectively lost contact with the network. In order to regain contact, they must all register with some other MSC/VLR which is still in contact with the covering satellite(s). This mass re-registration event would again choke the satellites' signaling resources and either greatly diminish or altogether eliminate the capacity for call traffic on the impacted satellite.

Figure 3:
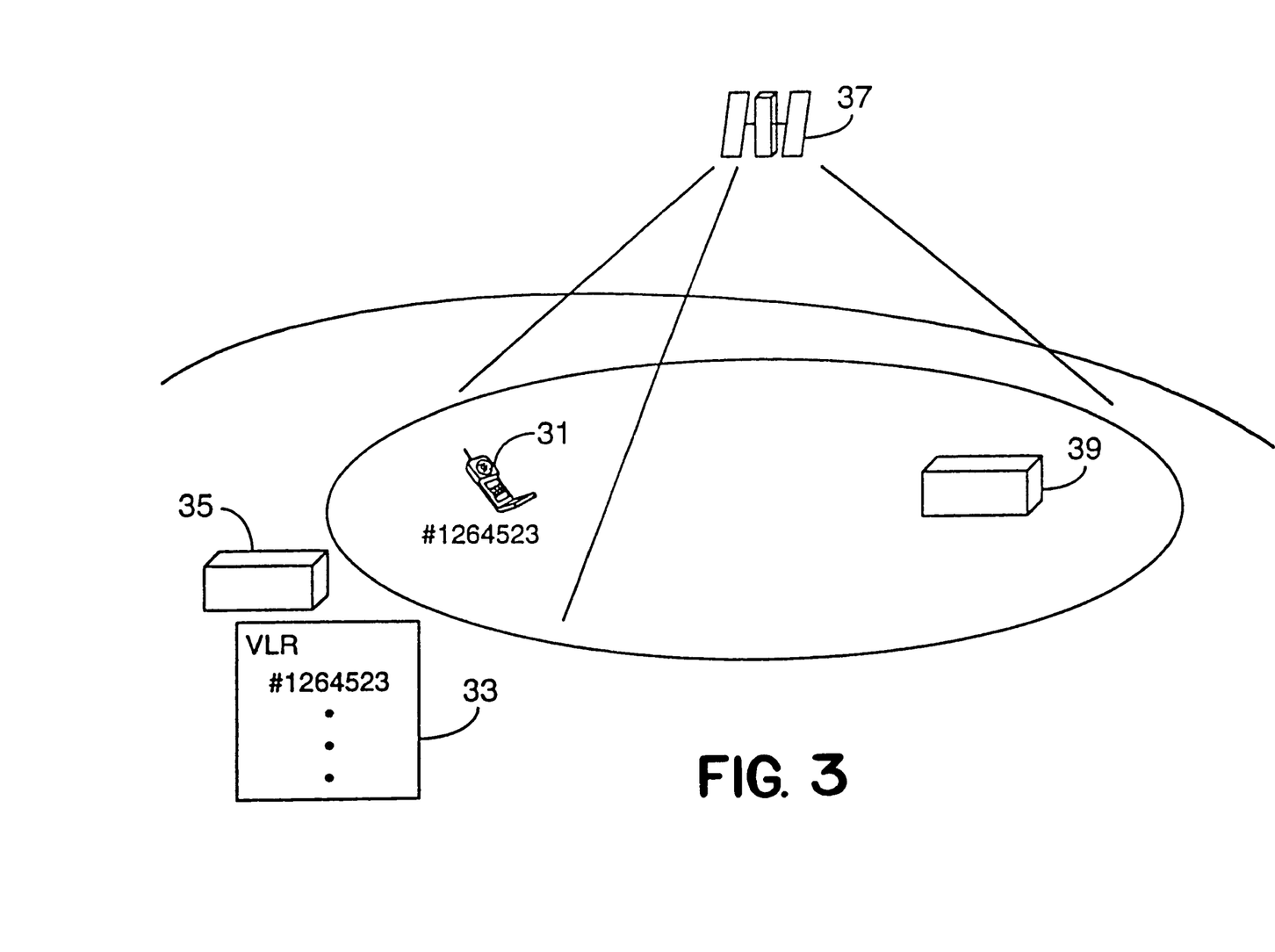
FIG. 3 illustrates how satellite to earth station connectivity can trigger terminal re-registrations.

FIG. 3 illustrates how satellite-to-earth station connectivity can trigger re-registrations. In FIG. 3, terminal 31 is registered in MSC/VLR 33 of earth station 35. As satellite 37, the only satellite covering terminal 31, moves overhead, it breaks contact with earth station 35. At that point, terminal 31, and all similarly registered neighbors, must re-register with earth station 39, or be lost to the system.

It is not practical to enlarge location areas in satellite-based telecommunications systems to the point where re-registration is not caused by satellite motion. Several proposed satellite-based systems deploy low- and medium-earth orbit satellites whose fields of coverage move across the entire earth in less than a day. Enlarging location areas to a size to include all of the earth or very large portions of the earth would place an impractical paging burden on the radio resources of the satellite systems.

To be effective, a satellite-based telecommunications system must support a range of location area sizes while limiting the number of re-registrations to only those necessitated by the movement of the terminals from one location area to another (i.e., no mass re-registrations caused by satellite motion). Further, the system should be interoperable with current commercially-available MSC/VLRs, GW-MSCs, and HLRs so that its development and deployment costs permits commercially feasible implementation.

Thus, there is a need for a satellite-based mobile telecommunication system that eliminates mass registration events and re-registrations due to network causes without causing service-impacting interruption of communication service.

Another objective of the invention is to provide an apparatus and method which permits terminals to be registered in multiple VLRs simultaneously in order to alleviate mass registration events and re-registrations due to network causes.

A further objective of the invention is to provide an apparatus and method which enables a satellite system that enables efficient tracking of terminals and location areas, in relation to satellite coverage areas, in order to prevent having terminals lost to the system.

A still further objective of the invention is to provide an apparatus and method for a terminal which enables registration in multiple VLRs, permitting an efficient alternative to mass registration events and re-registrations due to network causes.

SUMMARY OF THE INVENTION

These and other objectives are achieved in, and the aforementioned problems are solved by, a satellite-based mobile telecommunications system having a multiple registration location register which enables terminals to be registered in the Visitor Location Registers (VLRs) of multiple earth stations. The multiple registration location register stores information sufficient to reroute calls (e.g., all signaling involved in the establishment and maintenance of a connection as well as the call traffic) intended for a terminal through any one of the earth stations in which the terminal is registered, depending on which one is providing coverage for the terminal at that time. If the multiple registration location register receives routing information which indicates that a call is being routed to a terminal via an earth station which is not providing coverage for the terminal at that time, the multiple registration location register can check its stored information and modify the routing information so that the call proceeds to an earth station which is in fact providing coverage. A terminal, instead of having to tie up the system by re-registering every time an earth station no longer provides coverage, simply changes its terminal identity and adopts the registration information of the earth station now providing coverage.

DETAILED DESCRIPTION OF THE INVENTION

Figure 4:
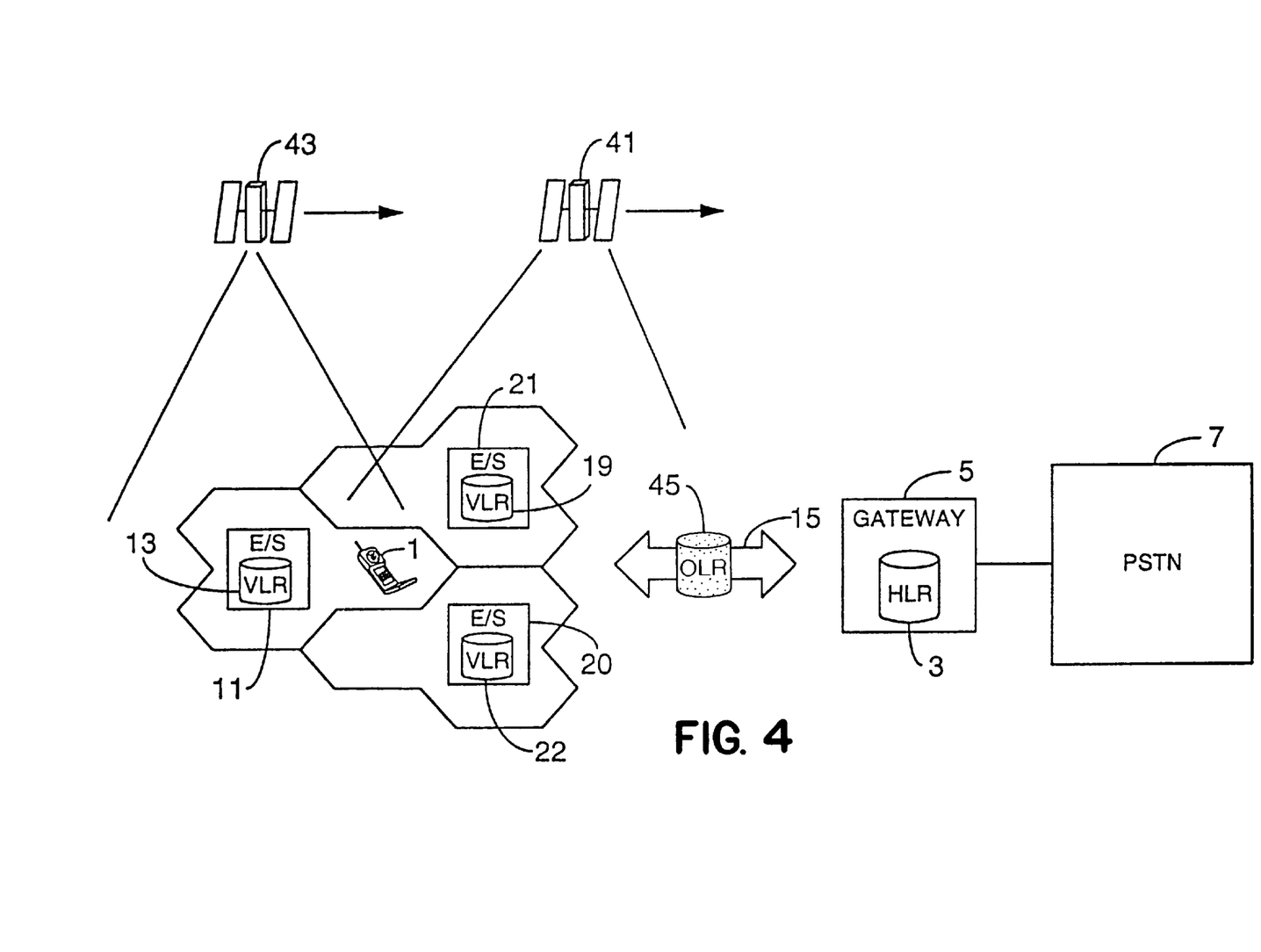
FIG. 4 illustrates one embodiment of the satellite-based mobile telecommunications system built in accordance with the present invention.

FIG. 4 illustrates one embodiment of the satellite-based mobile telecommunications system built in accordance with the present invention. FIG. 4 is similar to the terrestrial system of FIG. 1, but adds, of course, satellites 41 and 43, as well as a multiple registration location register ("OLR") 45 which adds transparent functionality to the existing cellular network of FIG. 1. Specifically, OLR 45 may be placed anywhere in communication link 15 which communicatively couples any one of earth stations 11, 20 and 21 with HLR 3 of gateway 5, and permits terminal 1 to be registered with multiple VLR's simultaneously. For example, OLR 45 enables terminal 1 to be registered in VLR 13, VLR 19, and VLR 22 simultaneously without any one of those VLR's knowing that terminal 1 is registered with any other VLR and without HLR 3 knowing that terminal 1 is registered with more than one VLR. This configuration permits a terminal within a given location area whose earth station coverage changes to merely change identity rather than re-register as it was required to do when it changed location areas (and thus earth stations coverage) in the terrestrial system described with respect to FIG. 1.

For example, in reference to FIG. 4, terminal 1 is registered with VLR 11, 19, and 22 simultaneously, but is presently being serviced, e.g., by earth station 21 (VLR.19) through satellite 41. when terminal 1 registers with each VLR, each VLR transmits the registration information to what each believes to be HLR 3. OLR 45 intercepts this information and records it, only transmitting VLR 19 registration information to HLR 3, since terminal 1 is presently being serviced by earth station 21. (Note: A pseudo-VLR identity may be used in place of using one of the actual VLR identities. This will not alter the basic operation of the invention.) When satellite 41 moves on, terminal 1 does not need to re-register with each station 11 through satellite 43 to remain communicatively coupled to the system because it is already registered there. Instead, terminal 1 merely changes identity and begins communicating to earth station 11 through satellite 43. When a call (e.g., all signalling involved in the establishment and maintenance of a connection as well as the call traffic) comes in from PSTN 7, HLR 3 believes that terminal 1 is still being serviced by earth station 21 (VLR 19) and thus gateway 5 attempts to establish a call with earth station 21. OLR 45 intercepts this call, and then re-routes the call to the proper earth station, i.e., earth station 11, based on its recorded information. Thus, OLR 45 acts as a transparent location register which enables multiple VLR registrations without disturbing the rest of the system or without the system even knowing of the multiple registrations.

Figure 5:
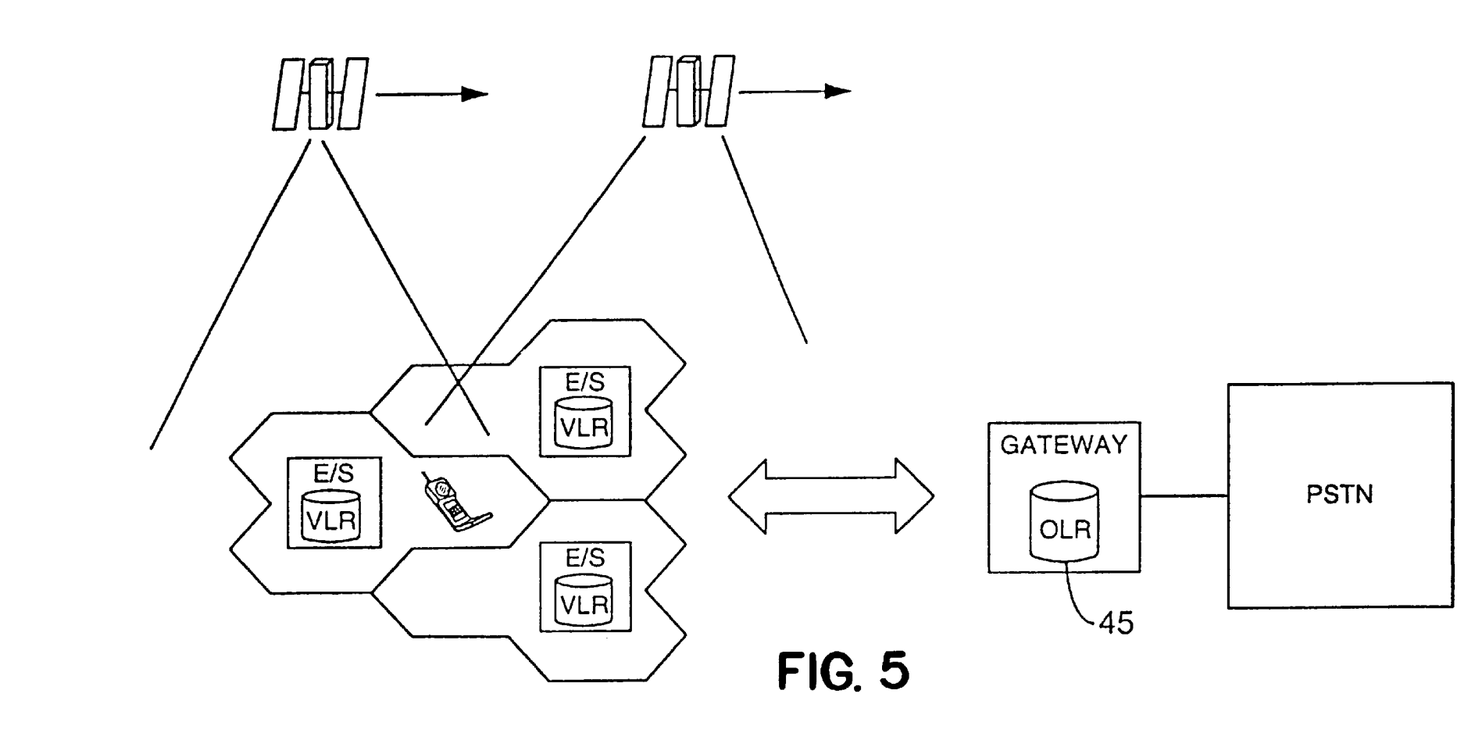
FIG. 5 illustrates another embodiment of the satellite-based mobile telecommunications system built in accordance with the present invention.

FIG. 5 illustrates another embodiment of the satellite-based mobile telecommunications system built in accordance with the present invention. This embodiment is similar to that found in FIG. 4, but shows OLR 45 simply replacing HLR 3. In other words, the OLR becomes a new HLR with additional functionality that permits terminals to register in multiple VLR's simultaneously.

Figure 6:
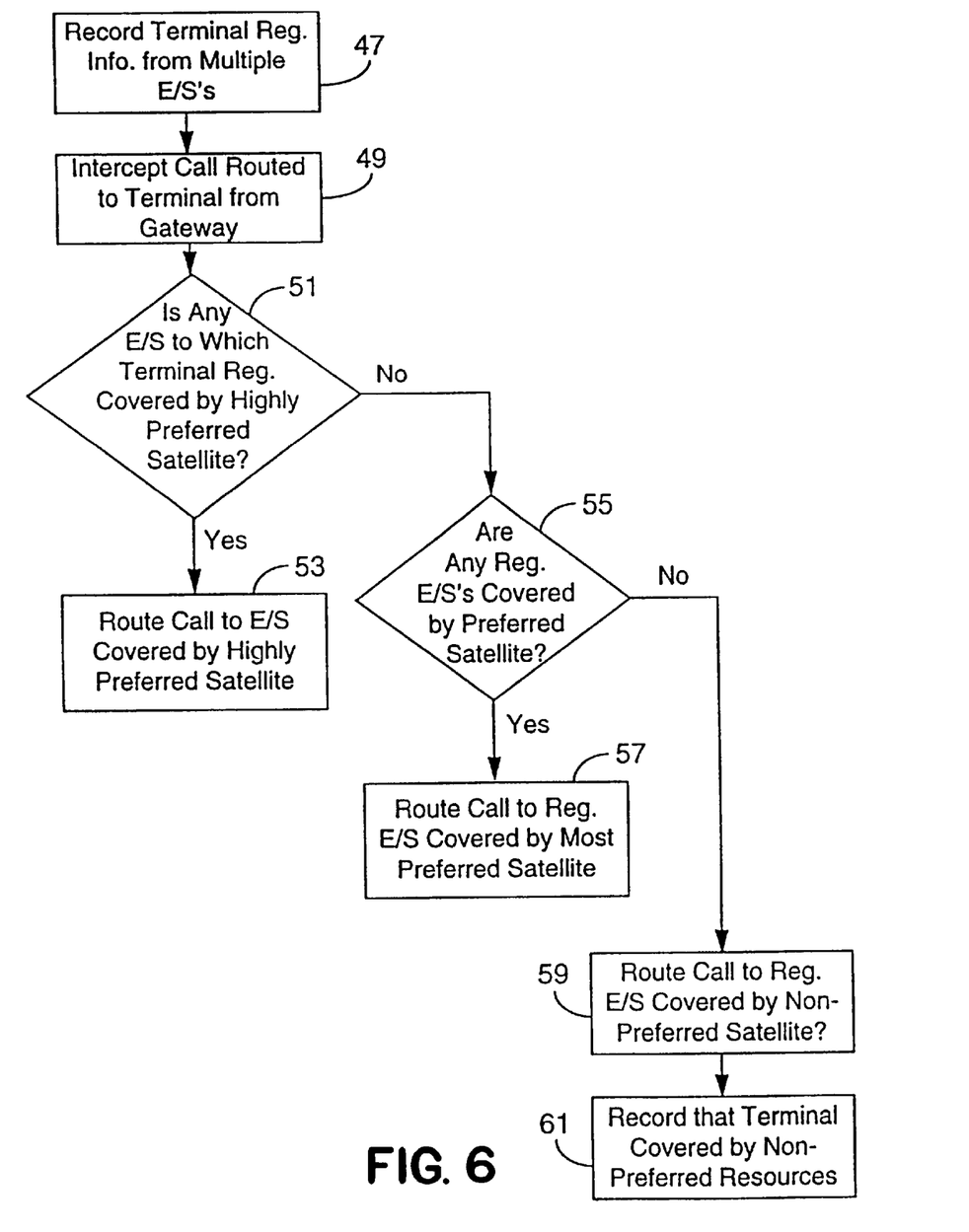
FIG. 6 is a flow diagram which demonstrates functionality of one embodiment of the OLR according to the present invention.

FIG. 6 is a flow diagram which demonstrates in more detail the functionality of one embodiment of the OLR according to the present invention. As mentioned above, the OLR, at block 47, records terminal registration information from multiple earth stations. The OLR then, at a block 49, intercepts any calls routed to the terminal from the gateway. At this point, the OLR may consider many system factors in determining to which of the multiple earth stations it will route the call. For example, the OLR will, of course, consider the terminal location information received from the earth stations. But, in addition, the OLR may consider satellite motion, satellite coverage of terminals, satellite connectivity to earth stations, the earth station's sharing plan, the current state of the called terminal, the system traffic management plan, and load balancing information to determine how to route the call. Based on such information, the OLR can determine, for each location area, which satellite and/or earth station, if there is more than one, is best for system efficiency and thus the most preferred.

Figure 7:
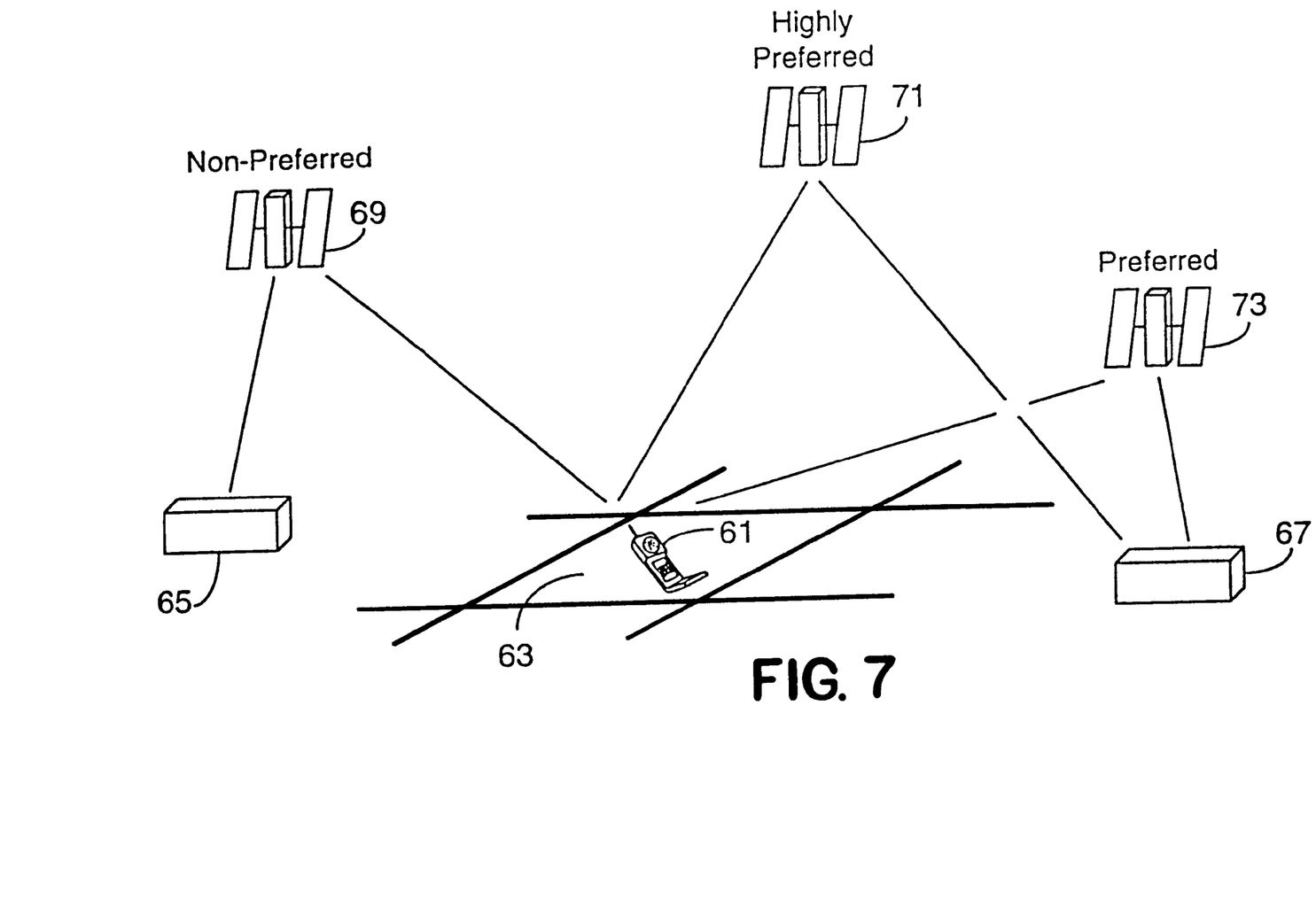
FIG. 7 illustrates an example of having more than one satellite which could be chosen by an OLR for routing a call intended for a given terminal in a given location area.

FIG. 7 illustrates an example of having more than one satellite and/or earth station which could be chosen by an OLR for routing a call intended for a given terminal in a given location area. In reference to FIG. 7, terminal 61 is located in location area 63 and is registered with both earth stations 65 and 67. Based on the location of satellites 69, 71 and 73, and other existing network and terminal conditions, the OLR may choose to route the call through either earth station 65 or 67. However, the system configuration may designate that satellite 71 is highly preferred, and that satellite 73 is preferred, for example, because it is connected to the same earth station as the highly preferred satellite 71. Satellite 69, since it is not connected to the same earth station as the highly preferred satellite 71, for example, may be designated as non-preferred.

Referring again to FIG. 6, the OLR, at a block 51, determines whether any of the earth stations to which the terminal is registered is covered by a highly preferred satellite. If such an earth station is covered by a highly preferred satellite, the OLR, at a block 53, routes the call to the earth station covered by the highly preferred satellite. If no such earth stations are covered by a highly preferred satellite, the OLR, at block 55, then determines whether any of the earth stations to which the terminal is registered is covered by a preferred satellite. If there is more than one preferred satellite, the OLR may, at a block 57, route the call to the most preferred, or to any particular one preferred satellite, depending on the system configuration. If there is only one preferred satellite, then the OLR routes the call to that one preferred satellite. However, if the terminal is not registered with an earth station that is covered by a highly preferred or preferred satellite, the OLR, at a block 59, routes the call to an earth station covered by a non-preferred satellite. Because such a situation is undesirable from a system efficiency standpoint, the OLR, at a block 61, may record that the terminal is covered by non-preferred resources for consideration in the routing of further calls.

Figure 8:
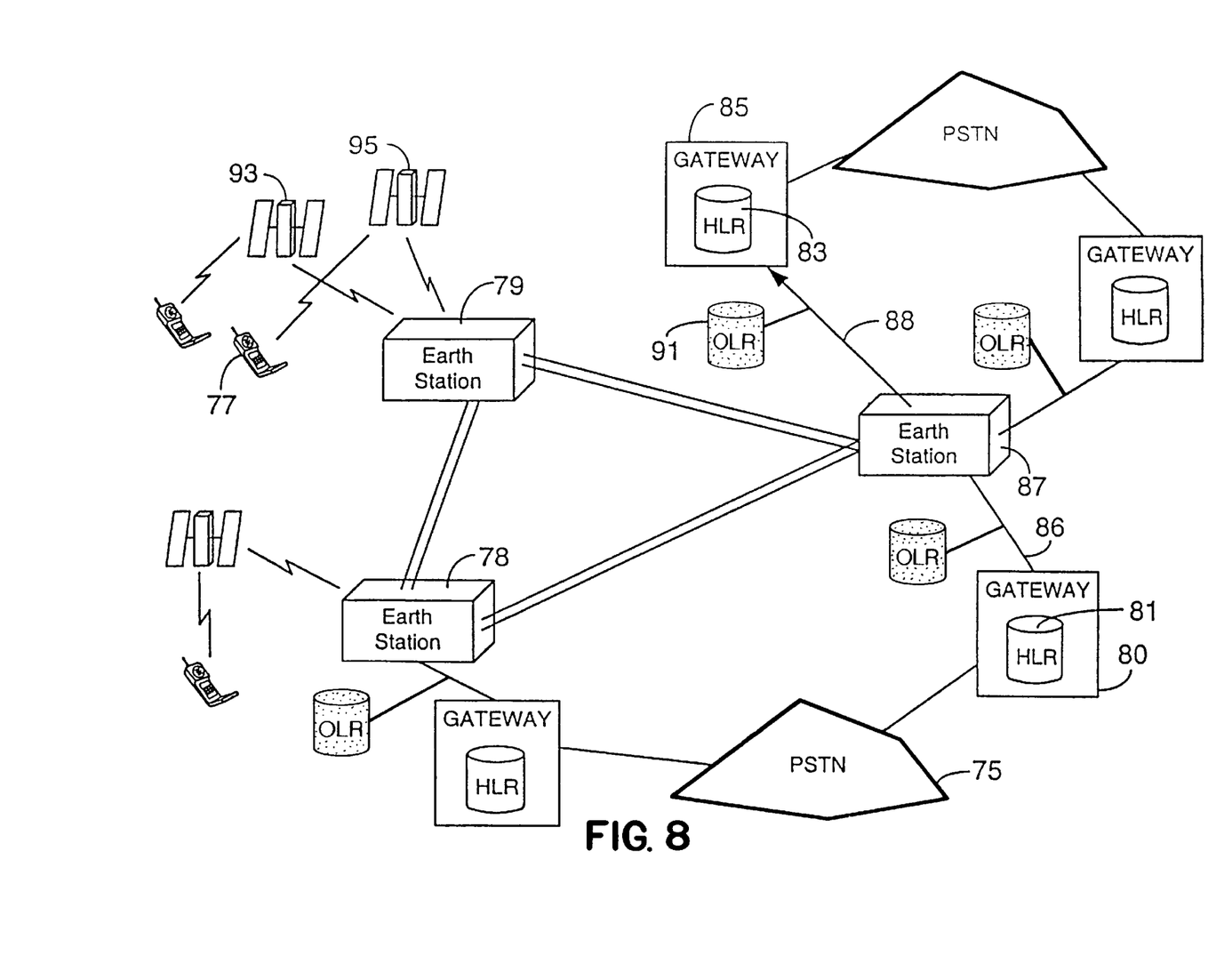
FIG. 8 is a diagrammatic illustration of one embodiment of the satellite-based mobile telecommunications system built in accordance with the present invention.

FIG. 8 is a more detailed diagrammatic illustration of one embodiment of the satellite-based mobile telecommunications system built in accordance with the present invention. Referring to FIG. 8, a call may come in, for example, from PSTN 75 intended for terminal 77, which has registered with earth station 78 and 79, and arrives at gateway 80. The gateway 80 checks the MSISDN number of terminal 77 and determines that, for example, terminal 77 is registered in HLR 83 of gateway 85. Gateway 80 then queries gateway 85 via communication link 86, earth station 87, and communication link 88. Gateway 85 checks HLR 83 and sends a response back to gateway 80 that terminal 77 is registered in, for example, earth station 78. This response is intercepted by OLR 91 which determines that terminal 77 is now covered by earth station 79 via two satellites, 93 and 95. OLR 91 then determines that satellite 95 is preferred and changes the routing information sent by gateway 85 before delivery of the information to gateway 80. Gateway 80 then, based on the changed routing information, routes the call via the system to terminal 77.

Figure 9:
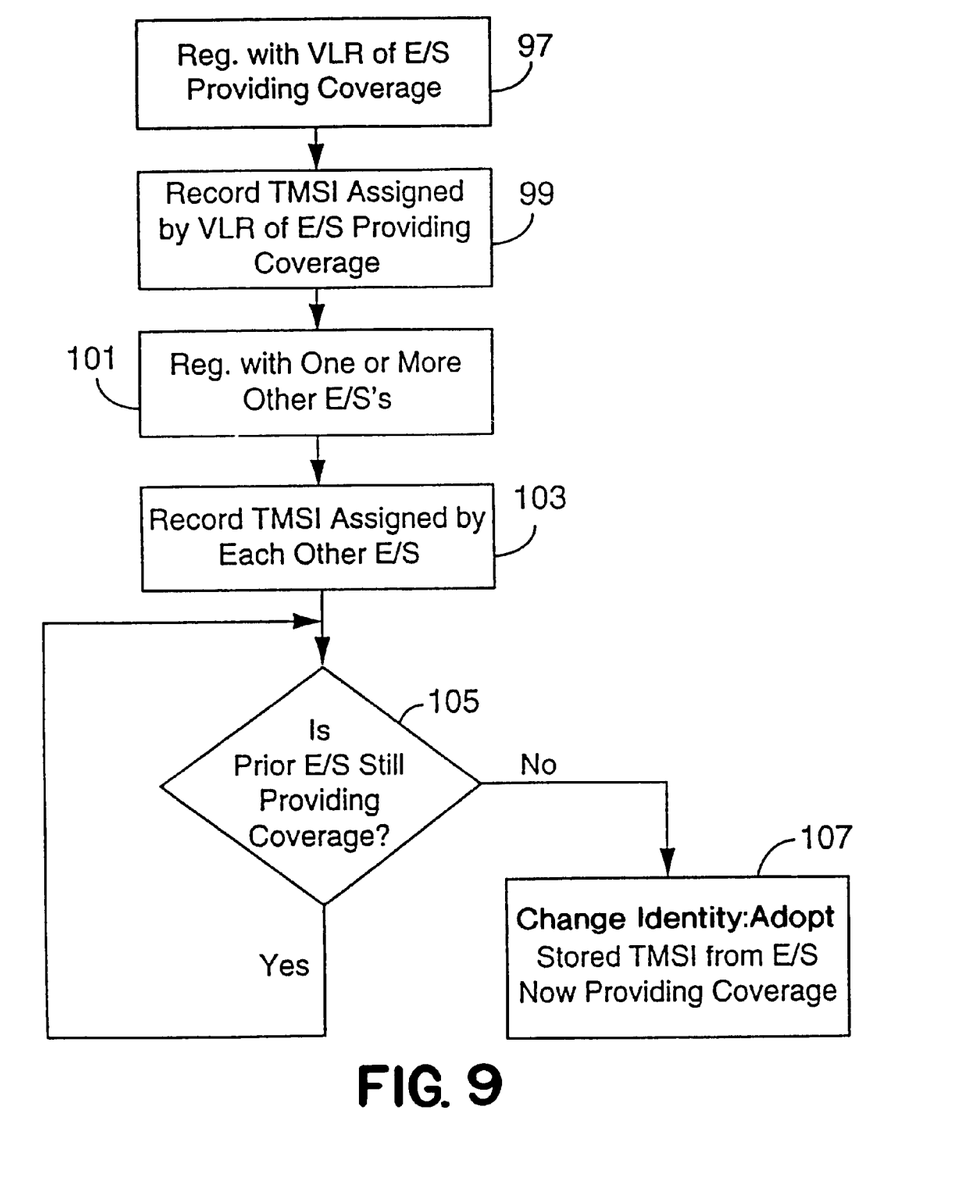
FIG. 9 is a flow diagram which demonstrates functionality of one embodiment of terminals built in accordance with the present invention.

As mentioned above, terminals are permitted to register with more than one earth station. FIG. 9 is a flow diagram which demonstrates functionality of one embodiment of terminals built in accordance with the present invention. When a terminal first powers up, for example, at a block 97, it registers with the VLR of the earth station providing coverage for the location area in which the terminal is then located. The terminal then, at a block 99, records the TMSI assigned by the VLR of the earth station providing coverage. The terminal then, at blocks 101 and 103, registers with one or more other earth stations as its network coverage changes and records the TMSI's assigned by each of the other earth station(s). During operation, at a block 105, the terminal determines whether the prior earth station, i.e., the one which was originally providing coverage, is still doing so. If it is, the terminal continues to operate through that earth station. If it is not, the terminal, at a block 107, changes identity and adopts the TMSI which was assigned to it by the earth station now providing coverage and continues to operate via that earth station.

Figure 10:
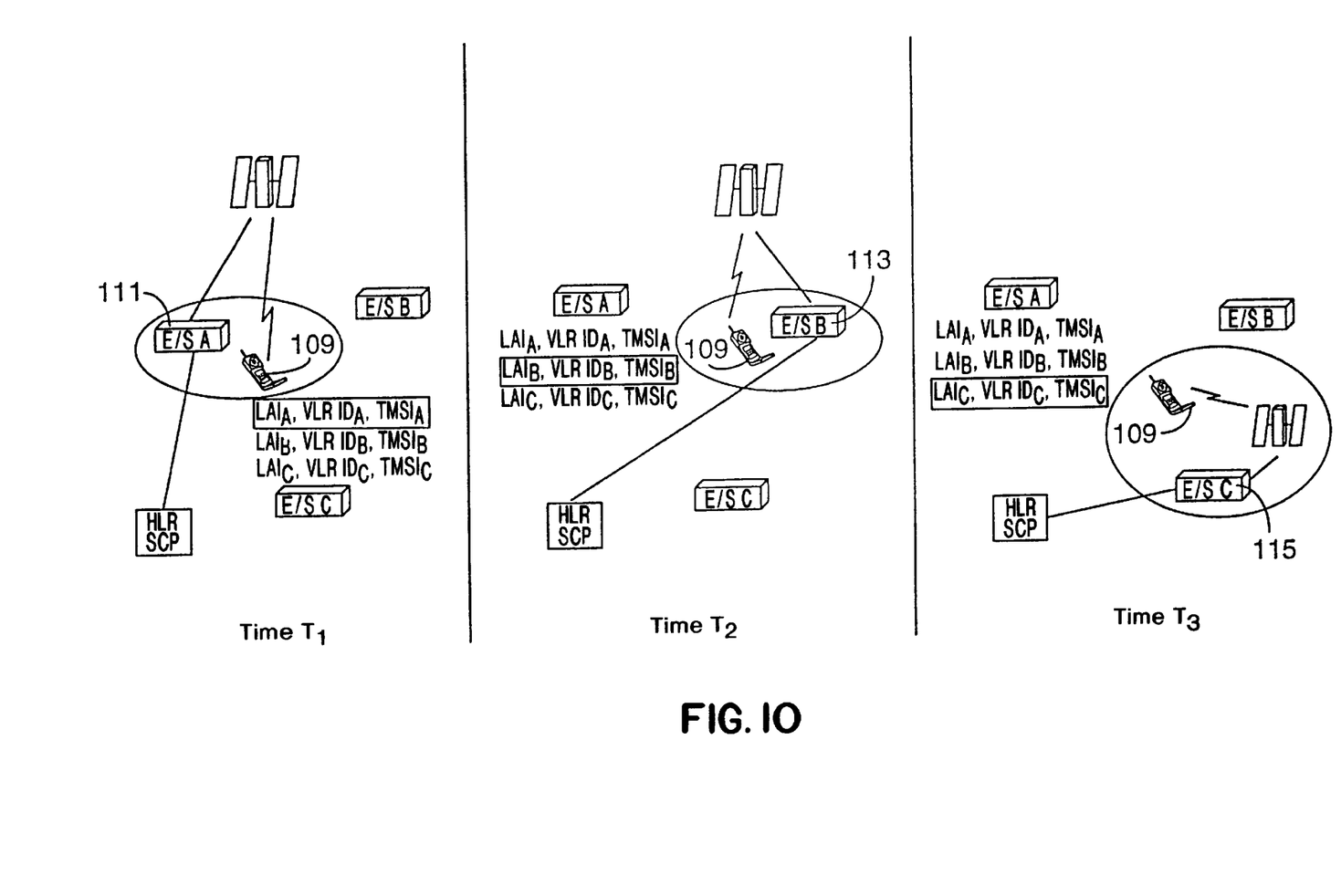
FIG. 10 is a diagrammatic illustration of a "non-moving" terminal multiple registration scheme in accordance with the present invention.

FIG. 10 is a diagrammatic illustration of a "non-moving" terminal (e.g., does not change location area) multiple registration scheme in accordance with the present invention. From $T_1$ through $T_3$, terminal 109 does not change location area. During this time, however, the coverage of terminal 109 changes because of changes in satellite to earth station connectivity. The terminal initially registers with each of earth stations 111, 113, and 115 in turn and stores information such as the LAI, VLR identification, and assigned TMSI for each registration. In one embodiment, a terminal which does not change location areas may register with as many earth stations as possible until it reaches a pre-determined maximum number of registrations. Then, the terminal erases the oldest registration and adds the current registration. In any event, as shown in FIG. 10, the terminal simply adopts the information it has stored for each earth station as satellite to earth station connectivity changes from earth station 111 at time $T_1$, to earth station 113 at time $T_2$, and finally to earth station 115 at time $T_3$. Because the OLR of the present invention knows the terminal's location and the satellite dynamics and contact plan, it knows how to route calls to the terminal through the correct earth station and satellite.

A different situation, however, is created when a terminal does change location areas. In one embodiment, a terminal is then required to re-register with the earth station currently providing coverage, and the terminal and VLR record the new registration information. The information is then forwarded to the OLR which also records the information and marks the old registration data (i.e., for other VLR's) as requiring update. The terminal similarly marks all old registration information records as requiring update. In one embodiment, if the terminal reaches a maximum number of simultaneous registrations, then the terminal purges the oldest registration. The OLR purges its own record of the terminal's oldest registration while also telling the VLR with the oldest registration to de-register the terminal. When the terminal subsequently contacts other earth stations, it re-registers with those earth stations to update its location, even if it was previously registered.

Figure 11:
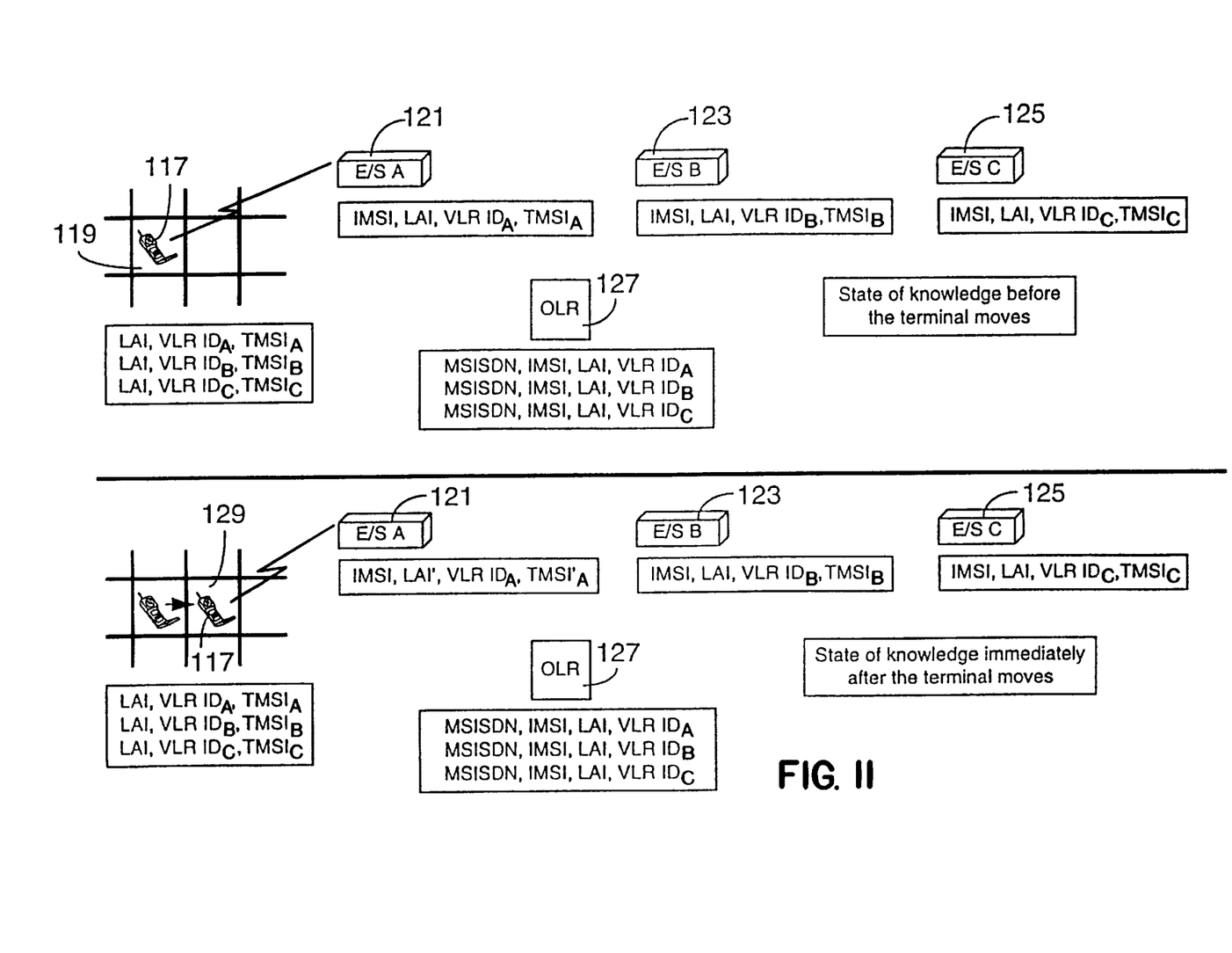
FIG. 11 is a diagrammatic illustration of a terminal re-registration scheme for terminals that change location areas in accordance with the present invention.

FIG. 11 is a diagrammatic illustration of a re-registration scheme for terminals that change location areas. When terminal L17 is located in location area 119, it registers with earth stations 121, 123, and 125, and records registration information (i.e., IMSI, LAI, VLR ID, and TMSI) for each. Likewise, OLR 127 receives and records similar registration information (i.e., MSISDN, IMSI, LAI, and VLR ID). When terminal 117 moves to location area 129, it re-registers with earth station 121, which in turn informs OLR 127 of the move. The terminal 117 and OLR 127 then mark their respective registration information relating to earth stations 123 and 125 as requiring update. Once the information is updated, the terminal 117 may operate according to the "non-moving" terminal multiple registration scheme discussed above with respect to FIG. 10 until the terminal 117 leaves location area 129. Thus, the terminal built in accordance with one embodiment of the present invention informs the system when it is covered through a new earth station while it is in its current location area and also when it has changed location areas. The terminal may also inform the network when it is covered only by a non-preferred satellite. Such feedback given the system by the terminal enables the OLR to better determine through which earth station calls intended for the terminal should be routed at any given time.

Figure 12:
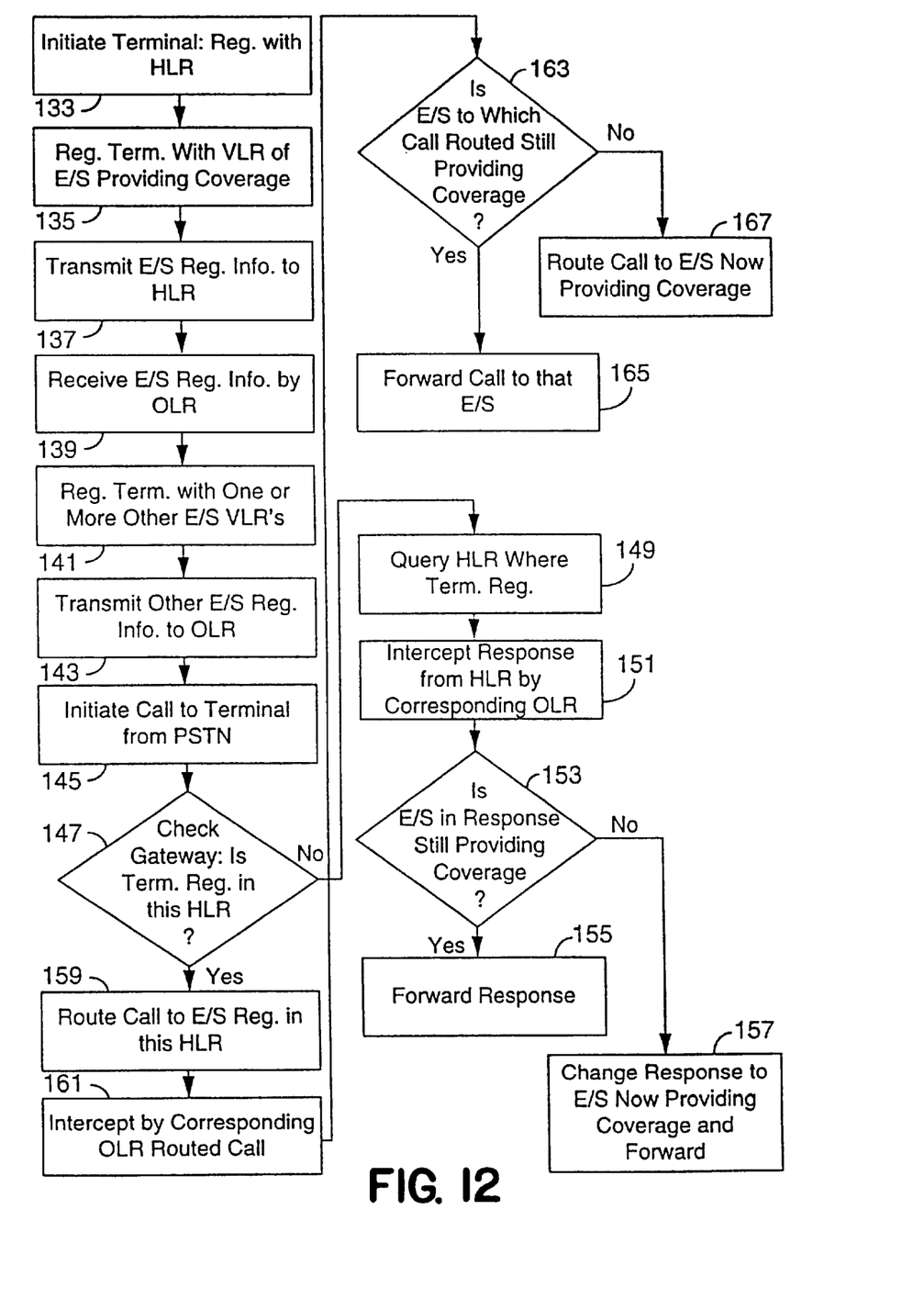
FIG. 12 is a flow diagram which demonstrates one embodiment of the overall system functionality for a newly activated terminal in accordance with the present invention.

FIG. 12 is a flow diagram which demonstrates one embodiment of the overall system functionality for a newly activated terminal. First, at a block 133, the terminal is registered in the system with an HLR. Then, at blocks 135 and 137, respectively, the terminal registers with the VLR of the earth station providing coverage, and the registration information is transmitted to the HLR. The OLR corresponding to the HLR at which the terminal is registered receives the registration information at a block 139. The terminal then, at blocks 141 and 143, registers with one or more other earth stations and transmits the information to the OLR. When a call is initiated at a block 145, the gateway to which the call came in checks, at a block 147, to see if the terminal is registered in its own HLR. If the terminal is not so registered, the gateway to which the call came in queries the HLR where the terminal is in fact registered at a block 149. The OLR corresponding to that HLR then, at a block 151, intercepts the response sent by the HLR and checks, at a block 153, the OLR's earth station registration information to determine whether the earth station designated in the response is still providing coverage. As discussed above, the OLR may evaluate many factors in order to make this determination. If it is still providing coverage, the OLR simply forwards the response at a block 155. If it is not, the OLR, at a block 157, changes the response, e.g., re-routes the call, to designate the earth station now providing coverage and forwards it to the gateway in which the call came.

If, on the other hand, at block 147, the terminal is found to be registered with the HLR of the gateway in which the call came in, a situation more likely for most users, the gateway, at a block 159, routes the call to the earth station registered in its HLR. The OLR then, at a block 161, intercepts the routed call and determines, at a block 163, whether the earth station to which the call is routed is still providing coverage, again evaluating several factors. If it is still providing coverage, the OLR simply forwards the call to that earth station at a block 165. If it is not, the OLR re-routes the call to the earth station now providing coverage.

While particular elements, embodiments and applications of the present invention have been shown and described, it will be understood, that the invention is not limited thereto since modifications may be made by those skilled in the art, particularly in light of the foregoing teachings. It is, therefore, contemplated by the appended claims to cover such modifications as incorporate those features which come within the spirit and scope of the invention.

We claim:

1. A satellite-based telecommunications system comprising:
   at least one non-geostationary satellite;
   a plurality of earth stations, each having a visitor location register (VLR);
   a terminal communicatively accessible to at least two earth stations via at least one non-geostationary satellite, said terminal being registered in VLR's corresponding to said at last two earth stations; and
   a multiple registration location register, said multiple registration location register (OLR) storing registration information identifying each VLR with which said terminal is registered, said OLR receiving calls directed to said terminal via a first earth station;
   said OLR rerouting said call to a selected second earth station.

2. In a satellite-based telecommunications system having a terminal communicatively accessible to first and second earth stations via a non-geostationary satellite and a multiple registration location register, a method of routing calls to the terminal, said method comprising the steps of:
   simultaneously registering the terminal with the first and the second earth stations;
   storing registration information identifying the first and second earth stations that are communicatively accessible to the terminal in the multiple registration location register;
   receiving a call and routing information indicating that the call be routed to the terminal via the first earth station; and re-routing the call to the terminal via the second earth station.

3. A satellite-based telecommunications system comprising:
- at least one non-geostationary satellite;
- a first earth station;
- a second earth station;
- a terminal communicatively accessible via at least one satellite to said first and said second earth stations; and
- a multiple registration location register storing registration information identifying said first and second earth stations with which said terminal may communicate, said multiple registration location register receiving routing information for a call to be sent to said terminal via said first earth station;
- said multiple registration location register modifying the routing information so that the call is re-routed to the terminal via the second earth station.

4. A satellite-based cellular telecommunications system comprising:
- a plurality of satellites;
- a plurality of earth stations;
- a terminal communicatively accessible via at least one satellite to each of said plurality of earth stations; and
- a multiple registration location register storing registration information identifying each earth station with which said terminal may communicate,
- said multiple registration location register routing a call to the terminal through one of the plurality of earth stations that is communicatively accessible to said terminal.

5. In a satellite-based telecommunications system comprising a satellite, a plurality of earth stations, a terminal, and a multiple registration location register, the terminal being communicatively accessible to each of the plurality of earth stations via the satellite, a method of routing a call by a location register, said method comprising the steps of:

registering the terminal with multiple earth stations;

storing registration information identifying each earth station that is communicatively accessible to the terminal in the multiple registration location register;

receiving, by the multiple registration location register, routing information designating one of the plurality of earth stations through which a call intended for the terminal should proceed;

determining whether the designated earth station is still providing coverage; and when the designated earth station is not still providing coverage, changing the routing information to designate another of said plurality of earth stations which is providing coverage.

6. A satellite-based telecommunications system comprising:
- at least one non-geostationary satellite;
- a plurality of earth stations;
- a terminal having direct contact with said non-geostationary satellite to communicate with one of said earth stations, said terminal being communicatively accessible to multiple earth stations; and
- a multiple registration location register (OLR) storing terminal registration information identifying all of said earth stations to which said terminal is communicatively accessible, said OLR intercepting any call directed to said terminal, said OLR choosing one of said earth stations to which said terminal is communicatively accessible and routing the call through a chosen earth station.

7. The satellite-based telecommunications system of claim 6 wherein said non-geostationary satellite that is communicatively accessible to said terminal is registered without storing new registration information.

* * * * *